May 28, 1957     J. E. WOODS     2,793,835
HEAT EXCHANGER CORE AND METHOD FOR FABRICATING THE SAME
Filed Aug. 30, 1954

INVENTOR.
JOHN E. WOODS
BY
ATTORNEYS

2,793,835
HEAT EXCHANGER CORE AND METHOD FOR FABRICATING THE SAME

John E. Woods, Cohasset, Mass., assignor to Standard-Thomson Corporation, Waltham, Mass., a corporation of Delaware Application August 30, 1954, Serial No. 452,879

5 Claims. (Cl. 257—128)

The present invention relates to heat exchangers, and more particularly to a headerless exchanger core fabricated of nested and welded thin-walled tubular elements.

In fabrication of conventional copper and aluminum heat exchangers, it has been common practice to form a plurality of tubular elements each having hexagonal or other suitably shaped ends. The elements are then joined in a soldering or brazing operation to form a core. This core is inserted in a jacket having suitable fluid connections, whereby one fluid may pass through the internal spaces of the tubes in heat exchange relation with another fluid passing through the interstitial space enclosed by the jacket.

The conventional materials and methods of heat exchanger manufacture have proved unsatisfactory or unworkable, however, for applications involving fluids at high temperatures and pressures. A number of factors become critical as the operating conditions become more intense.

For example, the melting point of the tubular elements or joining material may be approached. Also, the mechanical strength of the joints or of the tube walls becomes insufficient above a certain pressure. The thermal expansion coefficients of the materials may be the cause of excessive stress through repeated cycles of heating and cooling of the exchangers. Also, voltaic effects may result from the joining of the tubes with dissimilar metals, especially at higher temperatures. This may result in erosive and corrosive action which greatly reduces the strength of the core.

It will be further apparent that the foregoing factors are interrelated, whereby the failure of the tubes or joints may be the result of several contributing causes. Thus, ordinary soldered copper exchangers are found not to be satisfactory for use at temperatures above 250 to 300 degrees Fahrenheit. Aluminum exchangers, which are usually brazed, are found to have a higher limit for satisfactory service of the order of 400 or 500 degrees Fahrenheit.

When still higher temperatures are encountered, it becomes necessary to resort to the so-called "high-duty" metals and alloys such as stainless steel, Inconel, zirconium, molybdenum and titanium alloys, and monel metal. These metals melt at higher temperatures and are strong enough to withstand considerable pressure at temperatures in the range of 1200° F. to 1800° F. or 1900° F. But their physical and metallurgical properties create special problems in addition to those earlier encountered with copper and aluminum.

An especially serious metallurgical problem is involved when such metals are joined by brazing or welding with metals of dissimilar composition. Brazing metals are selected for their compatibility with the metal of the tubes, that is, their ability to wet the tube metal and join with it at a temperature at which the tubes will not be destroyed. But beyond such compatibility, it is necessary to consider the intended conditions of operation. At elevated operating temperatures the brazing metal and the contiguous portions of the tubes enter a solid solution in certain proportions. The physical properties of this solution depend upon the momentary "phase," as indicated by the phase diagram for the composition. As is well understood in the metallurgical art, this diagram shows the phases through which varying percentage compositions of a plurality of metals pass with changes in the temperature. Moreover, it will be seen that continued operation at elevated temperatures may cause the brazing material gradually to pervade the tubes, thus creating a complex distribution of varying compositions representing physical properties that not only vary at a given temperature but also vary differently at different temperatures. Thus, a condition may be created which, alone or in combination with some of the previously mentioned factors, may cause failure of the tubes or joints of the heat exchanger.

The problem of compatibility therefore has given rise to two distinct approaches in heat exchanger fabrication. The first is to devise better and more compatible brazing materials to be used with the newer alloys. To date, the most successful work to this end has produced an exchanger of steel tubes brazed with copper in a reducing atmosphere furnace. The second approach is to dispense altogether with brazing and the problems of compatibility, and to resort to direct welding of the tubes, whereby the entire core structure is of precisely uniform, and therefore controllable, composition, and the limiting upper temperature exceeds the values imposed by limits of compatibility. The present invention is characterized by this latter approach.

In the design of heat exchangers for aircraft, weight is a factor which imposes the requirement of tubes having extremely thin walls. This is especially necessary when the "high-duty" alloys are used, since their density may be considerable. For example, tubing as thin as .004 to .005 inch may be required. However, attempts with unimpressive success have been made over a number of years to weld together metal parts of such thickness. It was found that ordinary welding methods required the application of excessive heat in uncontrollable distribution to the joints to be welded, with the result that the thin walls curled, burned and disintegrated to some extent, thus precluding a uniformly tight and strong joint and causing substantial destruction of the core. Attempts have recently been made to devise specialized welding devices to join the tubes, but these have proved extremely elaborate, difficult to maintain, costly and not fully satisfactory as to the results obtainable.

The principal object of this invention is to provide a heat exchanger core of all-welded thin-walled tubing, the core being of completely homogeneous high-duty metal which is as light for the given fluid flow capacity as may be permitted for the particular alloy used and the given operating pressures and temperatures.

Another object is to provide a method for fabricating such a heat exchanger core.

With these principal objects in view, as well as others hereinafter appearing, the features of the invention include the application to a particular structural organization of elements comprising the exchanger core, of a method of progressive, localized arc welding in which the space surrounding the portion being welded is protected by a shielding envelope of inert gas. According to the invention, the structural elements of the assembly are expressly designed to control the arc behavior, whereby a continuous weld of great uniformity is produced and the thin walled nested tubes are joined without objectionable burning, curling or other forms of destruction.

Another feature is the simplicity of the method and the reduction of wastage in fabrication. When properly understood, the method of the invention may be readily used to produce a superior quality exchanger from parts of the prescribed design and dimensions, without the elaborate and costly equipment heretofore deemed necessary.

Other features of the invention reside in certain details of structure, methods and modes of operation which will be more clearly understood from the following description thereof, reference being had for the purpose to the accompanying drawings, in which Fig. 1 shows an hexagonal insert to be received within the end of each tube according to the invention;

Figure 1:
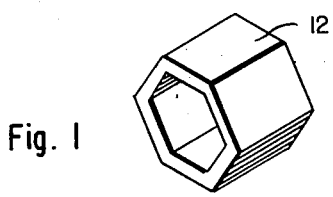
Figure 2:
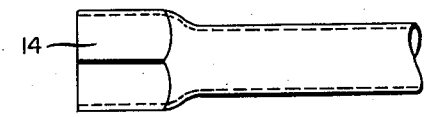
Fig. 2 is a side elevation of the end portion of a representative thin-walled tube.

Referring to Figs. 1 and 2, I show an insert 12 of hexagonal shape both inside and outside. This insert is made of identically the same metal as the individual tubes 14, which may be one of the "high-duty" alloys or metals previously mentioned, or other metal adapted to withstand equivalent temperatures in operation. The tubes 14 are ordinarily made from lengths of round, thin-walled tubular stock having a thickness of as little as .004 inch or less, although it will be apparent that the invention is useful for and comprehends tubing of greater thickness as well. The ends of each length of tubing are shaped in a die to produce a figure suitable for nesting in a core, preferably a regular hexagon. The inserts 12 have considerably thicker walls and are preferably made by drawing round tubular stock through suitable dies. The outside dimensions of each insert are such as to produce a close fit within the hexagonal end portion of each tube.

Figure 3:
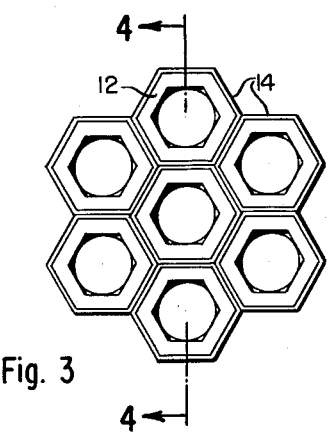
Fig. 3 is an end elevation of a nested, unwelded core according to a preferred embodiment of the invention.
Figure 4:
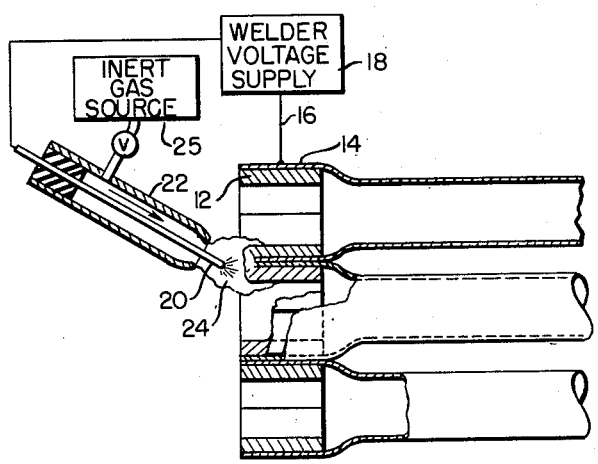
Fig. 4 is an elevation in section taken on line 4—4 of Fig. 3.

According to the preferred arrangement, the tubes 14 are hexed to a size whereby the required interstitial spacing is provided by the nested tubes. The tubes are nested in suitable bundles as illustrated in Figs. 3 and 4.

It will be observed that the thin walls of adjacent tubes are thus contiguous, and that all portions of the hexagonal tube ends are closely supported by the considerably thicker metal of the inserts 12.

The bundle is preferably held together for the welding operation in a suitable fixture which also provides an electrical connection 16 to the welder voltage supply 18.

The preferred method of welding is variously referred to as the "inert arc" or "shielded arc" method. Shielded arc welding is comparatively new, and has been practiced to some extent for several years in the fabrication of expansion joints, valves and the like. The general arrangement is schematically illustrated in Fig. 4. An electrode 20, which may be either consumable or non-consumable, strikes an arc to the work which is maintained with suitable intensity by the voltage supply 18. The electrode passes through a tubular rod 22 which directs an envelope 24 of inert gas over and around the arc and the work, substantially as illustrated. The earlier, unshielded electric arc methods developed excessive, uncontrollable quantities of heat after the arc was struck, and were hence restricted to welding heavier bodies of metal. In contrast, the shielded arc method comprehends the application of small quantities of heat through a controlled admixture of alternating and direct current voltages, or of one of these alone depending upon the metals to be welded. The inert gas from a source 25 is also selected according to the metals to be welded, and is argon or helium or similar gas. I preferably use a non-consumable tungsten electrode and an argon envelope in welding stainless steel tubing.

When the foregoing welding method was applied to the illustrated core assembly, unexpected and highly satisfactory results were achieved with a minimum of effort and adjustment. The arc, when once struck to the work, was simply moved either manually or mechanically over the entire end face of the core at a uniform distance therefrom. Seeking the shortest air gap, the arc was not extinguished as the electrode passed over the openings of the inserts, but tended to follow the metal. The end surfaces presented by the walls of the tubing being small as compared with the end surfaces of the adjacent supporting inserts, only a proportionately small part of the arc reached the tubing directly. That part which struck the inserts generated the greater part of the heat, which melted the inserts and served indirectly to heat the tubing walls. As illustrated in the drawing, the adjoining ends of the tubes and the contiguous walls of the inserts were uniformly fused together. This was made possible by the combination of inert gas shielding to prevent oxidation and complete mechanical reinforcement of the tubing on both sides by the inserts.

While the invention is not limited to any particular method of moving the electrode in relation to the work, I preferably mount the core holding fixture on a lathe with a suitable slip ring for the electrical connection 16. I then feed a single or multiple electrode across the face of the bundle as it is revolved so as to bring the arc adjacent each portion of the work for the same length of time.

It will be apparent that the essential features of the invention may also be obtained without the use of an envelope 24 of inert gas provided the entire core is immersed in inert gas under a hood or within an enclosed chamber. This is a matter of choice, although the illustrated method is preferred for ease of manipulation.

Figure 6:
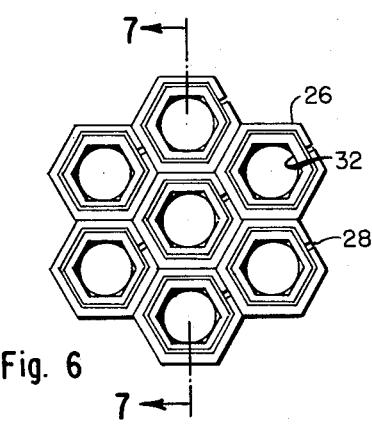
Fig. 6 is an end elevation of an unwelded core utilizing the spacing ferrule of Fig. 5.
Figure 7:
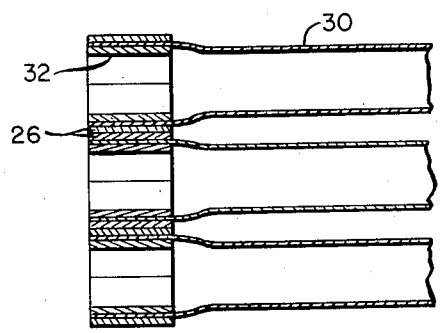
Fig. 7 is an elevation in section taken on line 7—7 of Fig. 6.
Figure 5:
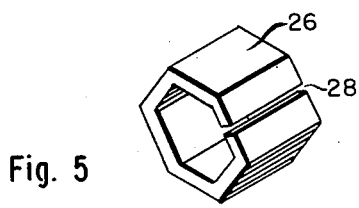
Fig. 5 shows a spacing ferrule according to an alternative form of the invention.

The foregoing method of fabrication may result in excessive wastage due to splitting of the end walls of the tubing in the hexing operation. This can be avoided by the use of hexagonal ferrules 26 (Fig. 5). These ferrules are of identically the same metal as the inserts and tubes, and may be rolled up from sheet stock so as to provide slits 28. After welding, these slits assist in preventing stresses caused by contraction in cooling. Alternatively, the ferrules are made as described with reference to Fig. 1. The tubes 30 (Figs. 6 and 7) are hexed to a smaller extent than in the embodiment of Figs. 3 and 4, whereby the ferrules 26 fit closely over the tube ends, and the thickness of the ferrules provides the required additional spacing between the tubes. However, the tubing must be hexed to a sufficient extent to permit the insertion of sufficiently thick inserts 32 as taught by the method previously described. It will be understood that the inner openings of the inserts must be of sufficient size to prevent undue throttling of the fluid that is to be passed through the tube of the heat exchange unit.

It will be further understood that, while I have described the invention with reference to specific embodiments thereof, various modifications of the forms of the tubes, inserts and ferrules and various other adjustments of the welding method will suggest themselves to the skilled artisan, and that these are intended to be comprehended within the scope of the appended claims.

Having thus described the invention, I claim:

1. A heat exchanger core comprising nested tubular elements, each element including a thin metallic tube having an end portion shaped to permit nesting, an insert of the same metal and shape but of appreciably greater thickness closely fitted within said end portion, and a ferrule of the same metal and shape and having a longitudinal full-length slit fitted over said section, the thickness of the ferrules being adapted to provide a predetermined interstitial space between the elements, and the ends of contiguous tubes, inserts and ferrules being welded together.

2. A heat exchanger core comprising nested tubular elements, each element including a thin metallic tube having an insert of substantially the same metal inside an end section thereof, said insert having an appreciably greater thickness than the tube wall, the outer walls of the tube ends being in substantially continuous contact with one another and the inner wall of each tube being in substantially continuous contact with an insert, the ends of contiguous tubes and inserts being welded together.

3. A heat exchanger core comprising nested tubular elements, each element including a thin metallic tube having a ferrule of substantially the same metal fitted over an end section thereof and an insert of substantially the same metal fitted inside said end section, said ferrule and insert being in substantially continuous contact with the walls of the tube, said insert having an appreciably greater thickness than the tube wall, the outer walls of the ferrules being in substantially continuous contact with one another, and the ends of contiguous tubes, ferrules and inserts being welded together.

4. The method of welding a plurality of thin-walled metallic tubes to form a heat exchanger core which consists in inserting a member of similar shape and substantially the same metal but appreciably greater wall thickness within the end of each tube, assembling the tubes so as to obtain substantially continuous metallic contact between the outer walls thereof, and arc welding the contiguous edges of the nested tubes and inserted members in an atmosphere of inert gas.

5. The method of welding a plurality of thin-walled metallic tubes to form a heat exchanger core which consists in inserting a member of similar shape and substantially the same metal but appreciably greater wall thickness within the end of each tube, assembling the tubes so as to obtain substantially continuous metallic contact between the outer walls thereof, and arc welding the contiguous edges of the nested tubes and inserted members by progressive movement of an electrode adjacent thereto while enveloping the work contacted by the arc in a stream of inert gas.

References Cited in the file of this patent

UNITED STATES PATENTS 2,270,864    Blais ------------------ Jan. 27, 1942